(12) United States Patent
Schieke et al.

(10) Patent No.: US 11,826,841 B2
(45) Date of Patent: Nov. 28, 2023

(54) TOOL FOR PRODUCING BACK-TAPERS ON TEETH OF A GEARING OF A WORKPIECE IN THE FORM OF A GEARWHEEL

(71) Applicant: Präwema Antriebstechnik GmbH, Eschwege/Werra (DE)

(72) Inventors: Jörg Schieke, Erfurt-Marbach (DE); Jörg Reinhardt, Berka v.d.H. (DE)

(73) Assignee: Präwema Antriebstechnik GmbH, Eschwege/Werra (DE)

( * ) Notice: Subject to any disclaimer, the term of this patent is extended or adjusted under 35 U.S.C. 154(b) by 0 days.

(21) Appl. No.: 17/353,985

(22) Filed: Jun. 22, 2021

(65) Prior Publication Data
US 2021/0394291 A1 Dec. 23, 2021

(30) Foreign Application Priority Data
Jun. 22, 2020 (DE) ...................... 10 2020 116 413.0

(51) Int. Cl.
*B23F 19/10* (2006.01)
*B23F 21/12* (2006.01)

(52) U.S. Cl.
CPC .......... *B23F 19/102* (2013.01); *B23F 21/126* (2013.01)

(58) Field of Classification Search
CPC .... B23F 21/005; B23F 21/126; B23F 21/128; B23F 23/1206; B23F 19/102; B23C 2250/04; B23C 2250/08
See application file for complete search history.

(56) References Cited

U.S. PATENT DOCUMENTS

| 9,296,045 B2 | 3/2016 | Matheis |
|---|---|---|
| 10,464,150 B2 | 11/2019 | Shinjo |
| 10,894,293 B2 | 1/2021 | Zimmermann |
| 2008/0304926 A1 | 12/2008 | Kuchler |

(Continued)

FOREIGN PATENT DOCUMENTS

| CN | 203050522 U | 7/2013 |
|---|---|---|
| CN | 104942380 A | 9/2015 |

(Continued)

*Primary Examiner* — Alan Snyder
(74) *Attorney, Agent, or Firm* — THE WEBB LAW FIRM

(57) ABSTRACT

The invention makes a tool available, which allows highly precise, simultaneous production of two back-tapers on the tooth flanks of the teeth of a workpiece in the form of a gearwheel, independent of their width. For this purpose, the invention provides that the tool includes a tool carrier configured in elongated manner, in the manner of a journal, and oriented coaxial to its central longitudinal axis of the tool, and includes at least two blades, which come into engagement with the tooth to be machined, in each instance, removing chips during use, wherein the blades are held on the tool carrier at a distance from one another in the longitudinal direction of the tool carrier and extend over a partial length of the tool carrier, in each instance, in terms of their width. According to the invention, in this regard the position of at least one of the blades is adjustable in relation to the other blade, so as to balance out deformations of the tool carrier that occur during use. The invention also states a method for simultaneous production of at least two back-tapers on the teeth of a workpiece in the form of a gearwheel, by means of a tool according to the invention.

6 Claims, 2 Drawing Sheets

(56) References Cited

U.S. PATENT DOCUMENTS

2018/0079019 A1   3/2018   Heyn
2019/0232396 A1   8/2019   Bock

FOREIGN PATENT DOCUMENTS

| CN | 106964850 A | 7/2017 | |
|---|---|---|---|
| CN | 107530804 A | 1/2018 | |
| CN | 109317764 A | 2/2019 | |
| DE | 8714264 U1 | 2/1988 | |
| DE | 4200418 C1 * | 12/1992 | ............ B23F 17/005 |
| DE | 10060283 C1 | 6/2002 | |
| DE | 10108103 A1 | 8/2002 | |
| DE | 10127973 A1 | 12/2002 | |
| DE | 102004057836 A1 | 6/2006 | |
| DE | 102005025000 A1 | 12/2006 | |
| DE | 102005058731 A1 | 6/2007 | |
| DE | 102015104242 A1 | 9/2016 | |
| DE | 102016015528 A1 * | 6/2018 | |
| DE | 102018101854 A1 | 8/2019 | |

* cited by examiner

TOOL FOR PRODUCING BACK-TAPERS ON TEETH OF A GEARING OF A WORKPIECE IN THE FORM OF A GEARWHEEL

CROSS-REFERENCE TO RELATED APPLICATION

This application claims priority to German Patent Application No. 10 2020 116 413.0 filed Jun. 22, 2020, the disclosure of which is hereby incorporated by reference in its entirety.

BACKGROUND OF THE INVENTION

Field of the Invention

The invention relates to a tool for producing back-tapers on teeth of a gearing of a workpiece in the form of a gearwheel, wherein the tool has a tool carrier configured in elongated manner, in the manner of a journal, and oriented coaxial to the central longitudinal axis of the tool, and comprises at least two blades, which come into engagement with the tooth to be machined, in each instance, removing chips during use, wherein the blades are held on the tool carrier at a distance from one another in the longitudinal direction of the tool carrier and extend over a partial length of the tool carrier.

Description of Related Art

Likewise, the invention relates to a method for simultaneously producing at least two back-tapers on one of the teeth, in each instance, of a gearing of a workpiece in the form of a gearwheel, by means of a tool of the type explained above.

Typically, the gearwheels to be machined using a tool according to the invention or by using a method according to the invention are what are called "sliding sleeves." These are needed in manual transmissions of vehicles that are driven by an internal combustion engine. In order to ensure that the workpiece in the form of a gearwheel, which is brought into engagement with the sliding sleeve for a transfer of force, remains in engagement with the sliding sleeve even under the great forces that occur during use, what are called "back-tapers" are usually formed on the tooth flanks of at least some of the teeth of the sliding sleeve. These shape elements, configured in the manner of recesses or shoulders having a precisely determined geometry, prevent unintentional axial displacement of the workpiece in the form of a gearwheel that meshes with the sliding sleeve. In this regard, the back-tapers are typically formed on the end regions of the tooth flanks of the teeth of the gearing that are adjacent to the corresponding end face of the workpiece in the form of a gearwheel.

A tool and a method of the type indicated initially are known from DE101 27 973 A1, for example. The use of a tool that comprises two blades, as presented there, allows producing two back-tapers on the gearwheel at the same time. For this purpose, in the state of the art the blades are arranged in a line that is oriented axis-parallel to the central longitudinal axis of the tool, which line agrees with its axis of rotation, wherein the width of the blades, measured in the longitudinal direction of the tool carrier, corresponding to the width of the back-taper to be cut by them into the corresponding tooth flank, and the distance between the blades corresponds to the distance that is supposed to exist between the back-tapers to be formed on the corresponding tooth flank. At the same time, the blades can additionally be configured in accordance with the shape of the back-tapers to be formed. If, for example, back-tapers having a depth that increases proceeding from the edge of the back-taper assigned to the corresponding end face of the gearwheel, in the direction of the center of the width of the tooth flank provided with the back-tapers, then this can be accomplished by means of blades having a thickness that increases in a corresponding manner, proceeding from their narrow side assigned to the corresponding end face of the gearwheel, in the direction of the opposite narrow side, so that the blade has a cutting edge that runs at a slant in a top view of the blade.

In order to guarantee problem-free functioning during use of a workpiece in the form of a gearwheel, provided with back-tapers, the shape, location, and orientation of the back-tapers must agree precisely with the required values that result from the design of the gear mechanism. Adherence to this requirement proves to be difficult if the forces that occur during use are so great that the tool itself or the tool holder in which the tool is clamped during use are deformed. Such deformations occur, in particular, if the tool carrier has a great length that leads to great bending stresses or torsion stresses as a result of the transverse forces that occur during chip-removing machining of the component in the form of a gearwheel.

Tools held in a tool carrier having an enlarged length and, as a result, an enlarged projection with reference to the clamp in which they are held, are used, for example, for machining tooth flanks of teeth of sliding sleeves or comparable gearwheels, which are comparably wide. Such wide gearwheels are needed, for example, in manual transmissions of heavy machines, so as to be able to absorb the great forces that occur during their use. In order to be able to produce two back-tapers on selected teeth at the same time on such wide gearwheels, a tool must be used having a tool carrier that possesses a length that corresponds to the width of the workpiece in the form of a gearwheel. The slim, elongated shape of the tool carrier that results from this, in particular, brings with it the risk that the tool carrier or the tool holder that holds the tool deforms during machining. This deformation can consist of bending transverse to its central longitudinal axis or in twisting of the tool about its central longitudinal axis, wherein these types of deformation can also be superimposed.

Against the background of the state of the art as explained above, the task has arisen of creating a tool that allows highly precise, simultaneous production of two back-tapers on the tooth flanks of the teeth of a workpiece in the form of a gearwheel, independent of their width.

Likewise, a method is supposed to be stated, which makes it possible to produce two back-tapers on the tooth flanks of teeth of a workpiece in the form of a gearwheel, with great precision, simultaneously, even using a tool that has a delicately formed, elongated tool carrier.

The invention has accomplished this task by means of the tool as described herein.

Advantageous embodiments of the invention are indicated in the dependent claims and will be explained in detail below, as will the general idea of the invention.

SUMMARY OF THE INVENTION

A tool according to the invention, for producing back-tapers on teeth of a gearing of a workpiece in the form of a gearwheel, accordingly comprises, in harmony with the state of the art as presented initially, a tool carrier configured in elongated manner, in the manner of a journal, and oriented coaxial to the central longitudinal axis of the tool, and having at least two blades, which come into engagement with the tooth to be machined, in each instance, removing chips during use, wherein the blades are held on the tool carrier at a distance from one another in the longitudinal direction of the tool carrier and extend over a partial length of the tool carrier, in terms of their width.

According to the invention, in the case of such a tool the position of at least one of the blades is now adjustable in relation to the other blade, so as to balance out deformations of the tool carrier that occur during use.

In a corresponding manner, in the case of a method according to the invention, at least two back-tapers are produced simultaneously, in each instance, on the teeth of a gearing of a workpiece in the form of a gearwheel, by means of a tool that rotates about its central longitudinal axis, wherein the tool comprises a tool carrier configured in elongated manner, in the manner of a journal, and oriented coaxial to the central longitudinal axis of the tool, and at least two blades, which come into engagement with the tooth to be machined, in each instance, removing chips during use, wherein the blades are held on the tool carrier at a distance from one another in the longitudinal direction of the tool carrier and extend over a partial length of the tool carrier, in each instance.

According to the invention, a tool according to the invention is now used for such a method, and based on this at least the following work steps are completed:
  a) determining the bending deformation and/or torsion deformation that the tool carrier or the clamp in which the tool is held experiences during production of the back-taper;
  b) adjusting the position of an adjustable blade of the tool with reference to the other blade of the tool, in each instance, taking into consideration the deformation determined in work step a), in such a manner that the position and the shape of the back-tapers to be produced on the teeth of the gearwheel type meet a required value, in each instance;
  c) producing the back-tapers on the teeth of the workpiece that is in the form of a gearwheel.

With the invention, a back-tapering tool is therefore available, which allows simultaneous production of two back-tapers on the teeth of a workpiece in the form of a gearwheel, which workpiece is typically a sliding sleeve for a manual transmission. In this regard, the tool according to the invention allows production of back-tapers that fulfill the strictest demands with regard to their geometry, position, and orientation, even in the case of particularly wide teeth, which require an elongated, slim tool carrier. This particularly relates to the angular positions of the back-tapers, for which it is possible to guarantee optimal agreement with the corresponding required values, using a tool according to the invention.

The invention proceeds from the recognition that it is not necessary to stiffen the tool carrier or the tool holder for precise formation of two back-tapers on a tooth flank of a tooth of a gearwheel, in such a manner that they do not deform under the forces that occur during use. Instead, it is sufficient, according to the recognitions of the invention, to orient at least one of the blades on the tool carrier of a tool according to the invention, with reference to the other blade, in each instance, in such a manner that geometry errors are corrected, which errors would unavoidably occur, without a suitable counter-measure, as a result of the deformation of the tool or the tool holder, which deformation is accepted according to the invention.

In order to allow such orientation with the greatest possible variability and, accompanying this, to make a tool according to the invention suitable for machining different types of workpieces in the form of gearwheels, in particular sliding sleeves, and for use in different machines having different workpiece holders, in the case of a tool according to the invention, the position of at least one of the blades can be changed with respect to the other one, in each instance.

Typically, in the case of a tool according to the invention, the first blade is fastened to a region arranged on the free end of the tool carrier, while the second blade is arranged in the opposite end of the end region assigned to the tool carrier, which region generally follows a mounting pin that serves for clamping the tool in a tool holder. In this regard, a circumferential shoulder can be provided between the mounting pin and the tool carrier, which shoulder forms the transition between the tool carrier and the mounting pin. In this regard, the circumferential shoulder can be formed in the manner of a collar projecting in the radial direction relative to the pin, which collar forms a stop up to which the mounting pin can be pushed into the tool holder.

In the case of a tool according to the invention, the greatest deformations occur in the region of the free end of the tool, due to its slim shape. For this reason, at least the position of the blade provided there is adjustable, in a manner according to the invention, so as to compensate for the shape errors of the back-tapers to be produced, otherwise caused by the deformation of the tool carrier or of the tool holder. In contrast, the other blade, arranged close to the clamping location of the tool, can generally be mounted in fixed manner, because in practice, only negligible deformations of the tool carrier occur in the region closely adjacent to the clamping location. The blade that is fixed in place on the tool carrier in this embodiment and mounted unchangeably close to the mounting pin provided for clamping then forms a fixed reference point for adjustment of the blade that can be positioned in changeable manner. In this way, adjustment of the position of the adjustable blade becomes particularly simple. In contrast, for example in the case that the significant part of the deformation takes place in the tool holder, it can also be practical to make each of the blades of a tool according to the invention adjustable. In this way, even the complex shape errors of the back-tapers to be produced can be balanced out, which would be produced by the deformation of the tool holder and the related position deviation of the tool from its required position.

As a function of the deformations of the tool carrier that occur during use, it can be practical to provide for adjustability of the adjustable blade with reference to the central longitudinal axis of the tool, in the radial direction (to compensate for bending of the tool carrier or of the tool holder) or adjustability of the adjustable blade in the circumferential direction of the tool carrier (to compensate for twisting of the tool carrier), wherein these two possibilities of adjustment of the position of the blade that is adjustable, in each instance, can also be combined with one another.

The deformation of the tool or of the tool holder that occurs as the result of bending deformation and/or torsion deformation, and the accompanying deviation of the position of the blades, in particular of the adjustable blade, from the required position, which deviation occurs during use, based on the stresses that occur then, can be determined in work step a) of the method according to the invention, by means of practical tests or by calculation, for example by means of computer-assisted simulation, in known manner.

Setting the position of the at least one adjustable blade of the tool, in each instance, with reference to the other blade of the tool, in each instance, then takes place in work step b), taking into consideration the deformation determined in work step a), in such a manner that the position and the shape of the back-taper to be produced on the teeth of the gearwheel type fulfill a required value, in each instance.

For the adjustment, the adjustable blade, in each instance, can be held on a carrier that can be positioned in different positions on the tool carrier, for example by means of a releasable connection that acts with force fit and/or shape fit, such as, for example, a screw connection or a clamped connection.

In the case of a correspondingly adjusted tool according to the invention, the position of at least one of the blades deviates from the required position in the unused, unstressed state. However, this required position occurs automatically during machining of the workpiece in the form of a gearwheel (work step c)) during use, as the result of the deformations of the tool or of the tool holder. Consequently, during subsequent machining of the gearwheels optimal work results are obtained without further measures being required. Therefore the tool according to the invention and the method according to the invention are particularly suitable for series machining of workpieces in the form of gearwheels, because on the basis of the determination of workpiece or workpiece holder once determined in work step a), adjusting the position of the adjustable blade, carried out, in each instance, in work step b), holds true for all workpieces of a series that have the same form (work step c)).

According to an embodiment of the invention that is appropriate for practice, the distance between the blades, measured in the longitudinal direction of the tool carrier, i.e., axis-parallel to the central longitudinal axis of the tool, corresponds to at least four times the length of the blades, wherein distances between the blades that correspond to at most fifteen times the width of the blades cover the machining tasks that usually occur in practice.

In this regard, the width B of the blades, measured in the longitudinal direction, typically amounts to at most 20% of the length of the tool carrier, wherein in practice, the blades have a width of typically at least 5 mm. Therefore, the tool carrier of a tool according to the invention typically has a length of at least 25 mm, in particular at least 30 mm, wherein lengths of up to 200 mm cover the machining tasks that occur in practice. In this regard, the diameters of the tool carriers of tools according to the invention typically amount to up to 50 mm, so that the ratio Lwt/Dwt formed from the length Lwt and the diameter Dwt typically amounts to 0.5-4.

BRIEF DESCRIPTION OF THE DRAWINGS

In the following, the invention will be explained in greater detail using a drawing that shows an exemplary embodiment. The figures show, schematically and not to scale, in each instance.

DESCRIPTION OF THE INVENTION

Figure 1:
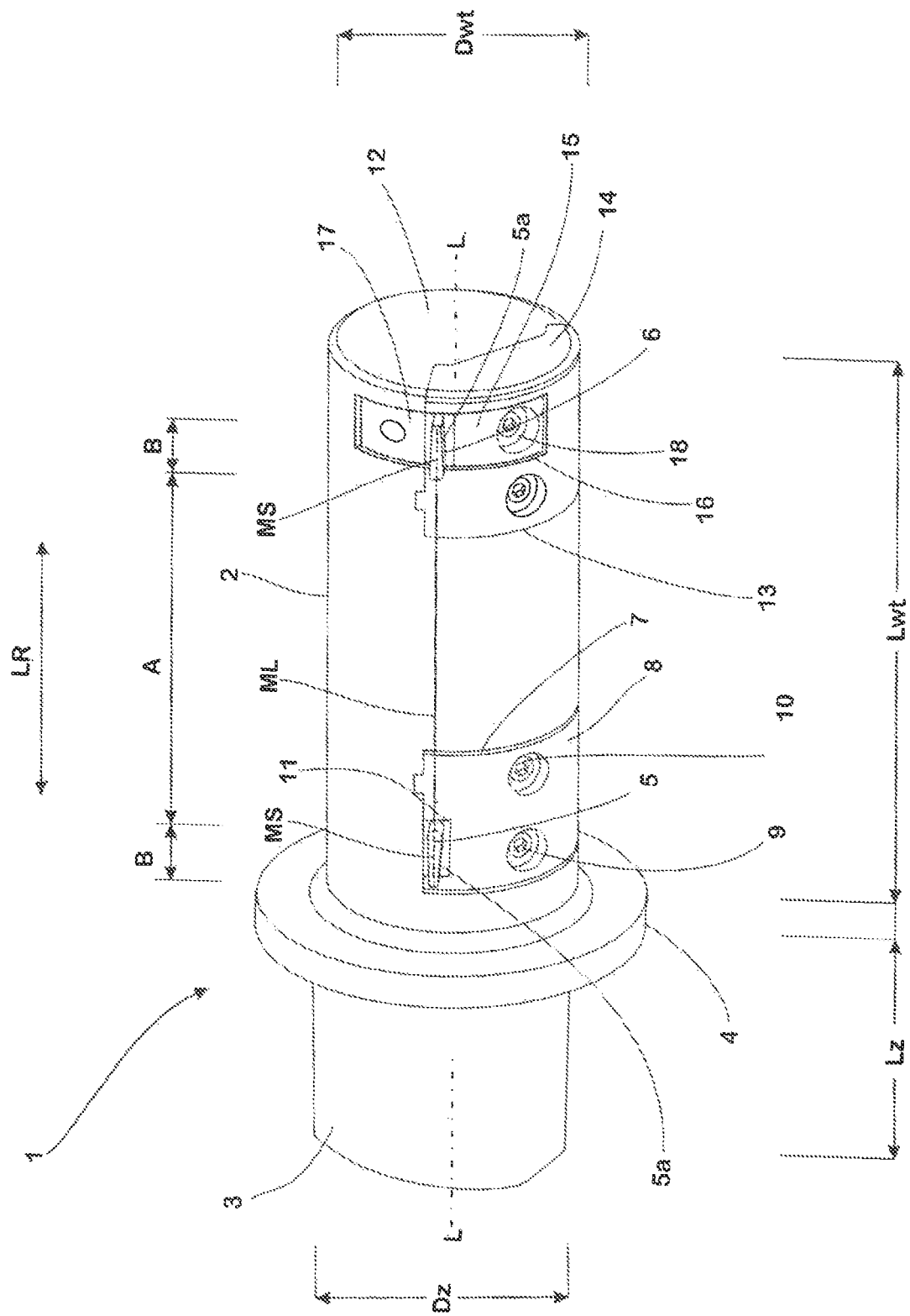
FIG. 1 a tool for producing back-tapers on teeth of a gearing of a sliding sleeve, in a perspective representation.

The tool 1 for producing back-tapers comprises an elongated tool carrier 2 in the manner of a journal, which has a cylindrical basic shape and is oriented coaxial to the central longitudinal axis L of the tool 1. The central longitudinal axis L of the tool 1 coincides with the axis of rotation about which the tool 1 serves during use.

The tool carrier 2 is carried by a mounting pin 3, which serves for clamping the tool 1 in a tool holder, not shown here, of a conventionally configured machine tool, also not shown here. The diameter Dz of the mounting pin 3 is greater than the diameter Dwt of the tool carrier 2, while the length Lwt of the tool carrier 2, measured axis-parallel to the longitudinal axis L, is about 3.5 times as great as the length Lz of the mounting pin 3, also measured axis-parallel to the longitudinal axis L. The transition between the tool carrier 2 and the mounting pin 3 is formed by a shoulder 4 configured in the manner of a circumferential collar, the diameter of which is greater than the diameter Dz of the mounting pin 3, so that the shoulder 4 projects radially outward beyond the mounting pin 3 and forms a stop, up to which the mounting pin 3 can be pushed into the tool holder, not shown, for use.

Two blades 5, 6 are attached to the tool carrier 2, which blades produce two back-tapers simultaneously during use on a tooth flank of the tooth to be machined, in each instance, of a sliding sleeve not shown here, by removing material of the tooth. In the example shown here, the back-tapers are formed with mirror symmetry with reference to the width of the tooth surface. However, they can also be arranged or configured in asymmetrical manner.

For this purpose, a recess 7 is provided in an end region of the tool carrier 2, which region borders on the shoulder 4 and is assigned to the mounting pin 3, in which recess a carrier element 8 sits with precise fit. This carrier element 8 has a curved outer surface, which fits into the outer contour of the cylindrical tool carrier 2. The carrier element 8 is fixed in place on the tool carrier 2 by means of screws 9, 10. On its one edge, which is oriented parallel to the longitudinal axis L, the blade 5 sits in a cut-out 11 of the carrier element 8 and is fixed in place there by means of the carrier element 8, in terms of its location and angular position β with reference to the longitudinal axis L of the tool carrier 2.

For fastening the second blade 6 in place, a further recess 13 is provided in an end region adjacent to the free end face 12 of the tool carrier 2, in which recess a carrier element 14 sits with precise fit, which element is shaped in accordance with the carrier element 8, in such a manner that its outer surface fits into the outer contour of the tool carrier 2, and it is fixed in place on the tool carrier 2 by means of a screw. In this regard, the blade 6 is held by an insert piece 15, which sits in a recess 16 of the carrier element 14. The recess 16 extends in the circumferential direction U of the tool carrier 2 and is supplemented by a recess 17 that is formed in the tool carrier 2. In this way, the angular position β' of the blade 6 with reference to the central longitudinal axis L and, accompanying this, with reference to the angular position β of the fixed first blade 5 can be adjusted by means of displacement of the insert piece 15 in the circumferential direction U, within the recesses 16, 17.

In addition, the insert piece 15, with the blade 6 that is carried by it and is adjustable in terms of its position, can be adjusted in the radial direction R with reference to the central longitudinal axis L. Fixation of the insert piece 15 and of the blade 6 in the corresponding angular position β' and of the corresponding radial position on the tool carrier 2 in turn takes place by means of a screw 18.

The blades 5, 6 are oriented in the longitudinal direction LR of the tool carrier 3 and with mirror symmetry relative to one another, in each instance. In this regard, the blades 5, 6 have a lesser thickness on their narrow sides that face away from one another, than on their narrow sides that face one another, so that the cutting edges 5a, 6a of the blades 5, 6 are oriented at a slant with reference to the orientation of the central longitudinal axis L.

The distance A between the wider narrow sides of the blades 5, 6, which are assigned to one another, approximately corresponds to six times the width B of the blades 5, 6, measured axis-parallel to the longitudinal axis L, and their width B in turn corresponds to approximately 10% of the length Lwt of the tool carrier 3, in each instance.

In the reference position, the center lines MS of the blades 5, 6 are oriented on a line ML that is oriented axis-parallel to the central longitudinal axis L. In this orientation, back-tapers on the tooth flank of the tooth to be machined, in each instance, which optimally have the same structure, are obtained.

Figure 3:
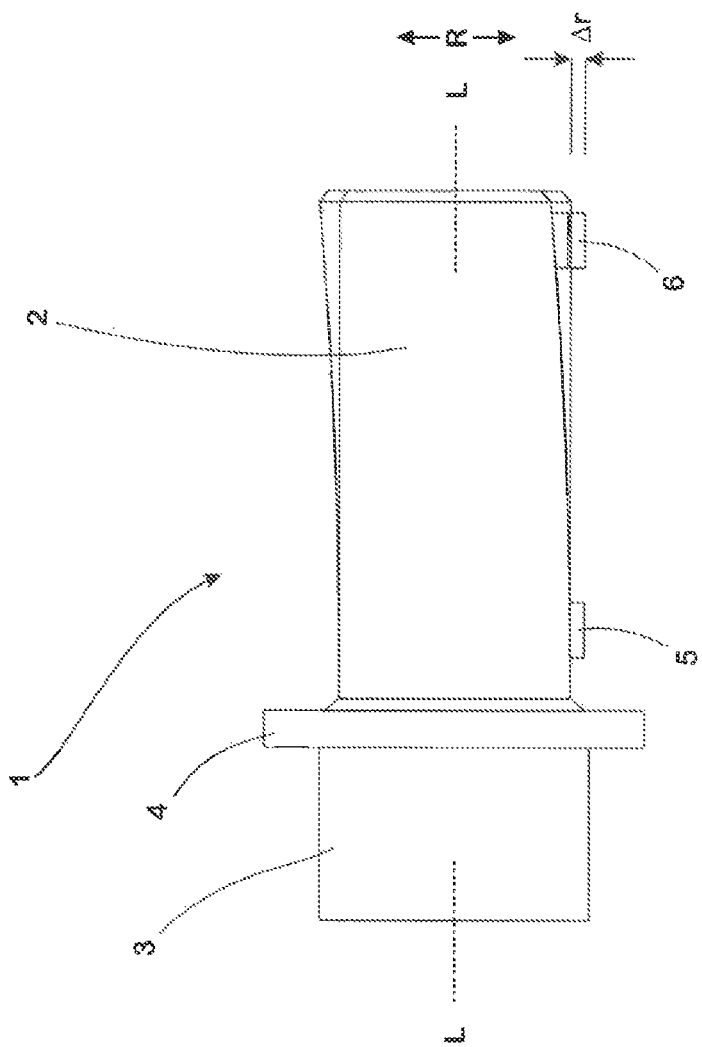
FIG. 3 the tool according to FIG. 1 in a top view from above.
Figure 2:
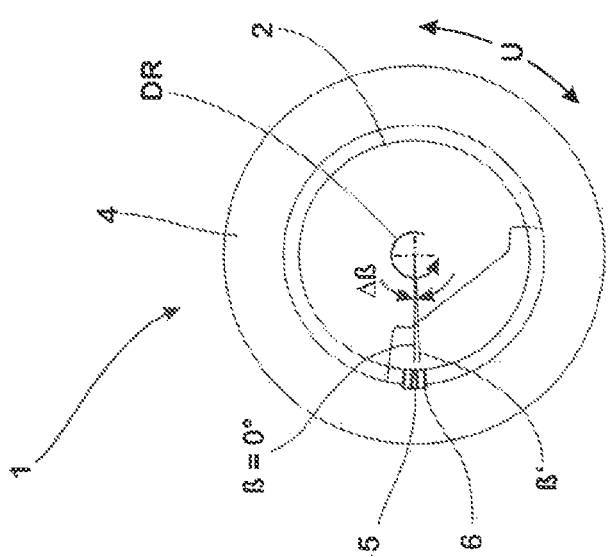
FIG. 2 the tool according to FIG. 1 in a frontal view.

During use, deformation of the tool carrier 2 due to torsion (FIG. 2) or bending (FIG. 3) can occur due to the transverse forces and moments that occur during chip-removing machining of the teeth of the gearing to be machined.

In the event of torsion, the tool carrier 2 twists more toward its front free end face 12, counter to the direction of rotation DR, than in its end region, which is assigned to the mounting pin 3. As a result, the angular position β' of the blade 6 assigned to the free end face 12, with reference to the central longitudinal axis L, would deviate from the angular position β=0° of the non-adjustable blade 5, assigned to the mounting pin 3, which also relates to the central longitudinal axis L, counter to the direction of rotation DR by an amount of angle Δβ, unless counter-measures were taken. The position of the blade 6 that results from this is indicated with broken lines in FIG. 2.

To balance out this change in the position of the adjustable blade 6 that occurs due to the torsion deformation of the tool carrier 2, as compared with the reference position, the insert piece 15, with the blade 6, is displaced in the circumferential direction U in the direction of rotation DR by the amount of angle Δβ. In the non-used, unstressed state, the position of the blade 6 therefore deviates from the reference position. During use, however, the blade 6 is in its reference position as the result of the torsion deformation of the tool carrier 2 that then occurs, in which position it is oriented in line with the fixed blade 5. In the event of small deviations, the change in position of the blade 6, which results from the torsion deformation and fundamentally follows an arc shape, can be approximated by means of a linear adjustment transverse to the longitudinal axis L of the tool. If it turns out that in spite of the adjustment that takes place in this manner, the change in position of the blade 6 that results from torsion cannot be balanced out, then for equalization, repositioning of the blade 6 that follows the arc shape can be undertaken.

In the event of bending, either the tool carrier 2 itself is bent toward the free end face 12 or the tool holder, not shown here, is deformed in such a manner that the longitudinal orientation of the longitudinal axis of the tool carrier 2 deviates from the reference position of the central longitudinal axis L. The deformation that occurs as a result is shown with broken lines in FIG. 3. Accompanying this, the radial position r' of the blade 6, with reference to the longitudinal axis L, would deviate from its radial reference position r by a distance of Δr.

To balance out this deviation, the insert piece 15, with the blade 6, is offset outward by the amount Δr in the radial direction R, with reference to the central longitudinal axis L, so that when the tool 1 is not in use, the position of the adjustable blade 6 deviates from its reference position, but in use, i.e., during machining of the teeth of the sliding sleeve, the blade 6 is in its reference position due to the change in its position that occurs as the result of the bending deformation that then occurs.

REFERENCE SYMBOLS 1 tool for producing back-tapers
2 tool carrier of the tool 1
3 mounting pin of the tool 1
4 rotating shoulder of the tool 1
5 fixed, non-adjustable blade of the tool 1
5a, 6a cutting edges of the blades 5, 6
6 variably adjustable blade of the tool 1
7 recess of the tool carrier 2
8 carrier element
9, 10 screws for attachment of the carrier element 8
11 cut-out of the carrier element 8
12 free end face of the tool carrier 2
13 recess of the tool carrier 2
14 carrier element
15 insert piece carrying the blade 6
16 recess of the carrier element 14
17 recess of the tool carrier 2
18 screw for fixation of the insert piece 15
β angular position of the blade 5 with reference to the longitudinal axis L
β' angular position of the blade 6 with reference to the longitudinal axis L
Δβ amount of angle
Δr distance
A distance between the blades 5, 6
B width of the blades 5, 6
DR direction of rotation of the tool 1
Dwt diameter of the tool carrier
Dz diameter of the mounting pin 3
L central longitudinal axis of the tool 1
LR longitudinal direction
Lwt length of the tool carrier 2
Lz length of the mounting pin 3
MS center lines of the blades 5, 6
ML line oriented axis-parallel to the central longitudinal axis L
U circumferential direction of the tool carrier 2
R radial direction R

The invention claimed is:

1. A tool for producing back-tapers on teeth of a gearing of a workpiece in the form of a gearwheel, wherein the tool has a tool carrier configured in elongated manner, in the manner of a journal, and oriented coaxial to a central longitudinal axis of the tool, and comprises at least two blades, which come into engagement with the tooth to be machined, in each instance, removing chips during use, wherein the blades are held on the tool carrier at a distance from one another in a longitudinal direction of the tool carrier and extend over a partial length of the tool carrier, in each instance, in terms of their width, wherein a position of at least one of the blades is adjustable in relation to the other blade, so as to balance out deformations of the tool carrier that occur during use, and wherein the position of the adjustable blade is adjustable in a circumferential direction of the tool carrier.

2. The tool according to claim 1, wherein the position of the adjustable blade is adjustable in a radial direction with reference to the central longitudinal axis.

3. The tool according to claim 1, wherein the distance between the blades, measured in the longitudinal direction of the tool carrier, corresponds to at least four times the width of the blades, measured in the longitudinal direction of the tool carrier.

4. The tool according to claim 1, wherein the width of the blades, measured in the longitudinal direction of the tool carrier, amounts to at most 20% of the length of the tool carrier.

5. A method for simultaneously producing at least two back-tapers on the teeth of a gearing of a workpiece in the form of a gearwheel, by means of a tool that rotates about its central longitudinal axis, wherein the tool comprises a tool carrier configured in elongated manner, in the manner of a journal, and oriented coaxial to the central longitudinal axis of the tool, and comprises at least two blades, which come into engagement with the tooth to be machined, in each instance, removing chips during use, wherein the blades are held on the tool carrier at a distance from one another in the longitudinal direction of the tool carrier and extend over a partial length of the tool carrier, in each instance, wherein the tool used is configured in accordance with one of the preceding claims, and that at least the following work steps are completed to produce the back-tapers:

a) determining the bending deformation and/or torsion deformation that the tool carrier or the clamp in which the tool is held experiences during production of the back-taper;

b) adjusting the position of an adjustable blade of the tool with reference to the other blade of the tool, in each instance, taking into consideration the deformation determined in work step a), in such a manner that the position and the shape of the back-tapers to be produced on the teeth of the gearwheel type meet a required value, in each instance;

c) producing the back-tapers on the teeth of the workpiece that is in the form of a gearwheel.

6. The method according to claim 5, wherein the workpiece in the form of a gearwheel is a sliding sleeve for a manual transmission.

* * * * *